(12) United States Patent
Parker et al.

(10) Patent No.: US 10,073,176 B2
(45) Date of Patent: Sep. 11, 2018

(54) SUPERRESOLUTION IMAGING OF SCATTERERS IN PULSE-ECHO IMAGING WITH SYMMETRIC STABILIZED PULSES

(71) Applicants: Kevin J. Parker, Rochester, NY (US); Shujie Chen, Rochester, NY (US)

(72) Inventors: Kevin J. Parker, Rochester, NY (US); Shujie Chen, Rochester, NY (US)

(73) Assignee: University of Rochester, Rochester, NY (US)

( * ) Notice: Subject to any disclaimer, the term of this patent is extended or adjusted under 35 U.S.C. 154(b) by 531 days.

(21) Appl. No.: 14/870,647

(22) Filed: Sep. 30, 2015

(65) Prior Publication Data

US 2016/0091605 A1    Mar. 31, 2016

Related U.S. Application Data

(60) Provisional application No. 62/057,448, filed on Sep. 30, 2014.

(51) Int. Cl.
*G01S 15/89*    (2006.01)
*G01S 7/52*    (2006.01)

(52) U.S. Cl.
CPC ...... *G01S 15/8977* (2013.01); *G01S 7/52077* (2013.01)

(58) Field of Classification Search
CPC ..................... G01S 15/8977; G01S 7/52077
See application file for complete search history.

(56) References Cited

U.S. PATENT DOCUMENTS

| | | | |
|---|---|---|---|
| 9,453,908 B2 * | 9/2016 | Parker | G01S 15/8977 |
| 2013/0331698 A1 * | 12/2013 | Parker | G01S 15/8977 600/443 |
| 2016/0091605 A1 * | 3/2016 | Parker | G01S 15/8977 367/7 |

* cited by examiner

*Primary Examiner* — Daniel T Pihulic
(74) *Attorney, Agent, or Firm* — Riverside Law LLP (57) ABSTRACT

Systems and methods of pulse-echo imaging using stabilized symmetric pulses are described. The systems and methods are based on the development of a class of symmetric, i.e., two sided, functions that can be designed and utilized as stabilized pulses. Stabilized pulses are pulses having stable inverse filters, and have previously only been established for asymmetric functions. The systems and methods described herein can be used for super-resolution pulse-echo imaging, for example super-resolution ultrasound imaging.

20 Claims, 9 Drawing Sheets

SUPERRESOLUTION IMAGING OF SCATTERERS IN PULSE-ECHO IMAGING WITH SYMMETRIC STABILIZED PULSES

CROSS-REFERENCE TO RELATED APPLICATIONS

This application claims priority to U.S. Provisional Application No. 62/057,448 filed on Sep. 30, 2014, incorporated herein by reference in its entirety.

BACKGROUND

Superresolution in pulse-echo imaging via the use of a transform has been previously described for stabilized asymmetric pulses. Stabilized pulses are those which, when sampled, have an exact inverse filter. Stabilized pulses, in this context, are realizable continuous functions in the axial and transverse directions that when sampled have their Z-transform zeroes lying within the unit circle. This corresponds to inverse filters that are stable because their poles lie within the unit circle, such that they are limited in time with bounded output. Such inverse filters are bounded and well behaved in the presence of noise, and proper design of the stabilized pulse, analyzed with the help of the Z-Transform, can be an important part of a superresolution strategy. However, previous work has only been directed to using an asymmetric pulse shape for generating stabilized pulses. Currently used symmetric functions in ultrasound and other imaging techniques do not have a stable inverse filter. Typical ultrasound pulses used for imaging are functions that, when sampled, have Z-transforms with many zeros on and outside of the unit circle. These produce inverse filters with poles outside of the unit circle, leading to unstable filters.

Accordingly, there is a need in the art for a superresolution strategy related to generating stabilized pulses from symmetric pulse shapes.

SUMMARY

Described herein are systems and methods for imaging a region of interest via stabilized symmetric pulses using a pulse-echo imaging device. In one embodiment, the method for imaging a region of interest using a pulse-echo imaging device, comprises generating a symmetric pulse with a pulse-echo imaging device; directing the symmetric pulse to be incident on a region of interest, thereby producing a reflected echo; receiving the reflected echo with the pulse-echo imaging device; applying an inverse filter to the reflected echo to form inverse-filtered echo data, wherein the inverse filter is a stable inverse filter corresponding to the symmetric pulse; and creating an image of the region of interest from the inverse-filtered echo data. In one embodiment, the pulse-echo imaging device comprises an ultrasound device. In one embodiment, the inverse filter is an inverse Z transform. In one embodiment, all of the zeroes of the Z transform lie within a unit circle. In one embodiment, the inverse filter suppresses noise in the image. In one embodiment, the image created is a super-resolution image.

In one embodiment, the system for imaging of a region of interest comprises: a pulse-echo imaging device for generating a stabilized symmetric pulse, and a processor in communication with the pulse-echo imaging device, wherein when a symmetric pulse generated by the device is incident on a region of interest, a reflected echo is received by the device; an inverse filter corresponding to the symmetric pulse is applied to the reflected echo via the processor to produce inverse-filtered echo data; and the inverse-filtered echo data corresponds to an image of the region of interest. In another embodiment, the system comprises a computer-readable storage medium; and code stored on said storage medium, wherein when executed on a processor in communication with a pulse-echo imaging device, the code: generates a symmetric pulse with the pulse-echo imaging device, wherein when the symmetric pulse is incident on a region of interest, a reflected echo is received by the pulse-echo imaging device; applies an inverse filter to the reflected echo to produce inverse-filtered echo data, wherein the inverse filter is a stable inverse filter corresponding to the symmetric pulse; and creates an image of the region of interest from the inverse-filtered echo data. In one embodiment of the system, the pulse-echo imaging device comprises an ultrasound imaging device. In one embodiment, the inverse filter is an inverse Z transform. In one embodiment, all of the zeroes of the Z transform lie within a unit circle. In one embodiment, the region of convergence of the Z transform is an annulus that includes the unit circle, yet none of the zeroes lie on the unit circle. In one embodiment, the inverse filter suppresses noise in the image. In one embodiment, the image is a super-resolution image. In one embodiment, the inverse filter is created from a shifted version of a beam pattern. In one embodiment, the beam pattern corresponds to a scatterer located between first and second sampled points.

BRIEF DESCRIPTION OF THE DRAWINGS

The following detailed description of embodiments will be better understood when read in conjunction with the appended drawings. It should be understood, however, that the embodiments are not limited to the precise arrangements and instrumentalities shown in the drawings.

DETAILED DESCRIPTION

It is to be understood that the figures and descriptions have been simplified to illustrate elements that are relevant for clear understanding, while eliminating, for the purpose of clarity, other elements found in the fields related to the subject matter described herein. Those of ordinary skill in the art may recognize that other elements and/or steps are desirable and/or required in implementing the systems and methods described herein. However, because such elements and steps are well known in the art, and because they do not facilitate a better understanding, a discussion of such elements and steps is not provided herein. The disclosure herein is directed to all such variations and modifications to such elements and methods known to those skilled in the art.

Definitions

Unless defined otherwise, all technical and scientific terms used herein have the same meaning as commonly understood by one of ordinary skill in the art. Any methods and materials similar or equivalent to those described herein can be used in the practice for testing of the systems and methods described herein. In describing and claiming the systems and methods, the following terminology will be used.

It is also to be understood that the terminology used herein is for the purpose of describing particular embodiments only, and is not intended to be limiting.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Ranges: throughout this disclosure, various aspects can be presented in a range format. It should be understood that the description in range format is merely for convenience and brevity and should not be construed as an inflexible limitation on the scope. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

Described herein are systems and methods related to stabilized symmetric pulses that are useful for applications such as pulse-echo imaging, including ultrasound imaging. The concept of stabilized pulses, which have stable and useful inverse filters, has been previously established for asymmetric functions (Parker, U.S. Pat. App. Pub. No. 2013/0331698, which is hereby incorporated by reference in its entirety). Described herein are a class of symmetric, i.e., two sided, functions that can also be designed and utilized as stabilized pulses. The systems and methods can use such stabilized symmetric pulses for super-resolution pulse-echo imaging. Accordingly, the systems and methods described herein extend the usefulness of the super-resolution approach to additional types of beam patterns that can be used in imaging systems.

Typical ultrasound pulses used for imaging are functions that, when sampled, have Z transforms with many zeroes on and outside of the unit circle. These produce inverse filters with poles outside of the unit circle, leading to unstable filters. Thus, direct application of an inverse filter to symmetric beampatterns commonly used in ultrasound imaging typically amplifies noise and degrades the beam quality, amongst other issues. Currently known methods for applying a stable inverse filter of conventional pulse shapes involve modifying the pulse to be asymmetric, thereby stabilizing the inverse transform (Parker, U.S. Pat. App. Pub. No. 2013/0331698). However, described herein are exemplary symmetric functions with stable inverse filters, and methods for identifying such symmetric functions, that can be used for ultrasound imaging. These symmetric functions do not need to be modified to be asymmetric to produce a pulse having a stable inverse filter. The finding of such symmetric functions useful for pulse-echo imaging is a surprising and unexpected result. In the current state of the art, applying an inverse filtering technique to symmetric beampatterns typically used for imaging processes has been related to poor performance, instability, and/or impracticality. Further description of stabilized symmetric pulses and their inverse filters is provided later herein.

Figure 1:
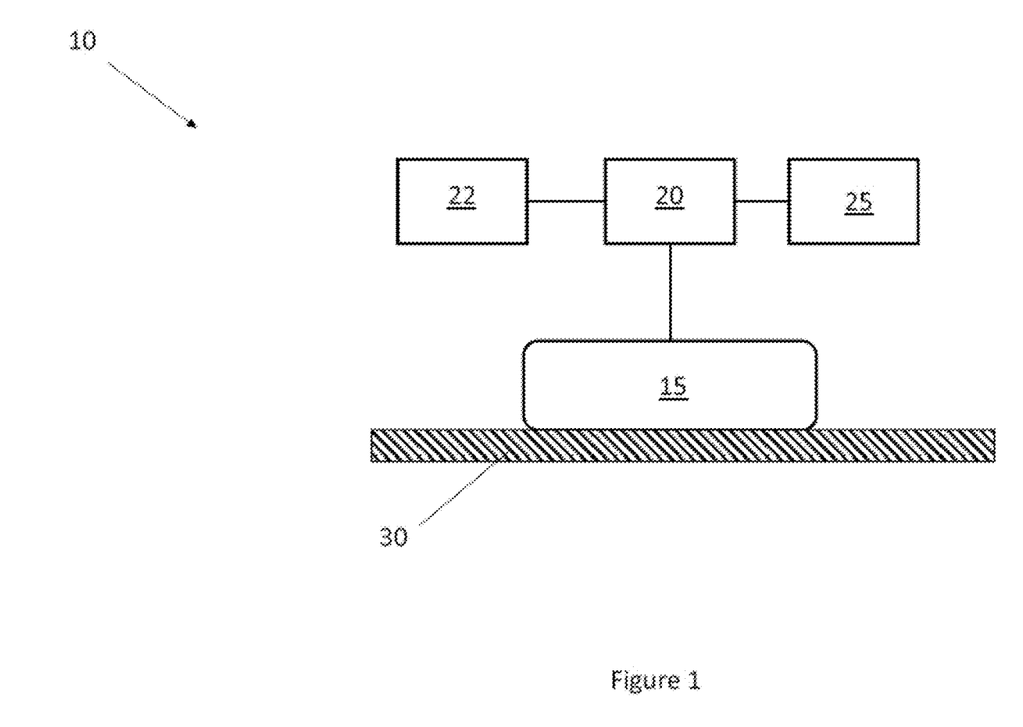
FIG. 1 is a schematic diagram of an exemplary embodiment of a pulse-echo imaging device that can be used to generate symmetric stabilized pulse.

Referring now to FIG. 1, a schematic diagram of an exemplary ultrasound system 10 that can be used with stabilized symmetric pulses is shown. System 10 includes an ultrasound transducer 15 that can be attached to a part of a subject or other region of interest 30. In one embodiment, a gel is placed between transducer 15 and region of interest 30. A processor 20 is communicatively coupled with transducer 15, for example via a wired or wireless connection. Processor 20 can be any type of microprocessor, as would be understood by a person skilled in the art. In one embodiment, processor 20 is further communicatively coupled to a storage medium 22 where software for controlling processor 20 resides. Storage medium 22 can be any type of storage medium, for example a hard disk drive. In one embodiment, processor 20 is also communicatively coupled to an output device 25, for example a display, a printer, a storage medium, or an Internet connection to a remote site.

System 20 can be used as follows. A symmetric pulse having a stabile inverse filter is generated from transducer 15 via processor 20. The stabilized symmetric pulse is directed to be incident on region of interest 30, such that a reflected echo from region of interest 30 is received by transducer 15. Processor 20 then applies an inverse filter corresponding to the symmetric pulse to the received echo, forming inverse-filtered echo data. The inverse-filtered echo data can then be used by processor 20 to generate an image of the region of interest, which can be displayed, printed, or stored by output device 25.

By applying an exact, stable inverse filter to the received echo, the result is a very high resolution, subwavelength solution to the distribution of scatterers that were previously below the resolution of an ultrasound pulse and imaging system. The integration of random scatterers over the pulse length and width is essentially disaggregated by the inverse filter operation. Therefore, the two dominant and problematic system effects of pulse length and speckle statistics are substantially eliminated, replaced by more favorable and high resolution calculation of the distribution of scatterers in the region of interest. The solution is exact within the framework of the convolution model and sampled signals, yet is approximate in the sense that the sampling frequency (nominally twice the center frequency of the transmit pulse in simple examples) will result in aliasing of any signal above the Nyquist frequency. The solutions are also accurate with respect to the physical reality to the extent that the convolution model is accurate and the effect of noise is limited. The resulting images are termed SURUS images, as they are super-resolution ultrasound images.

Described herein are also methods of imaging a region of interest in a subject using symmetric functions have stable inverse filters. In one embodiment, a symmetric pulse is generated with a pulse-echo imaging device; the symmetric pulse is then directed to be incident on a region of interest, thereby producing a reflected echo; the reflected echo is then received with the pulse-echo imaging device; an inverse filter is applied to the reflected echo to form inverse-filtered echo data, wherein the inverse filter is a stable inverse filter corresponding to the symmetric pulse; and an image of the region of interest is created from the inverse-filtered echo data. However, the method of imaging can comprise other steps, as would be understood by a person skilled in the art, and is not limited to only the specific steps recited herein.

Symmetric Functions for Super-Resolution Imaging

Described herein are symmetric, or two sided, pulse shapes that can be stabilized pulses, i.e., that have stable inverse filters. In some applications, it can be advantageous to utilize a symmetric stabilized pulse because such pulses tend to be more compact or have a simpler Fourier transform than some asymmetric stabilized pulses. Consider a right-sided, causal, exponential sequence:

$$x[n] = \begin{cases} \left(\frac{1}{2}\right)^n & \text{for } n \geq 0 \\ 0 & \text{for } n < 0 \end{cases}$$

This has the Z-transform $$X[z] = \frac{z}{z - \left(\frac{1}{2}\right)}$$

and a region of convergence (ROC) for all $|z|>(1/2)$ (Jackson, 1991, Signals, systems, and transforms. In: ed. Addison-Wesley series in electrical engineering. Reading, Mass.: Addison-Wesley, 1991). If samples of a real pulse follow this formula, than it is an asymmetric pulse, which is referred to as a stabilized pulse because the Z-transform ROC includes the unit circle, and an inverse exists. For double sided functions that are acausal, the ROC for a stable system with an inverse will be an annulus that includes the unit circle. For example, let $$x[n] = \begin{cases} \left(\frac{1}{2}\right)^n & \text{for } n \geq 0 \\ 3^n & \text{for } n < 0 \end{cases}$$

This is a double sided function, and its Z-Transform is:

$$X[z] = \frac{-z\left(3 - \frac{1}{2}\right)}{\left(z - \frac{1}{2}\right)(z - 3)}$$

with a ROC of $3>|z|>1/2$, which includes the unit circle. This function has an exact inverse filter that is given by:

$$p^{-1}[n] = \begin{cases} -\frac{2}{5} & n = -1 \\ \frac{7}{5} & n = 0 \\ -\frac{3}{5} & n = 1 \\ 0 & \text{elsewhere} \end{cases}$$

Note that in the double sided example, if the left sided function is $2^n$, then the function is symmetric about the origin, and this symmetric function still has a stable inverse filter.

$$p^{-1}[n] = \begin{cases} -\frac{2}{3} & n = -1 \\ \frac{7}{5} & n = 0 \\ -\frac{2}{3} & n = 1 \\ 0 & \text{elsewhere} \end{cases}$$

This example establishes the fact that symmetric functions can, in theory, form stabilized pulses with exact inverse filters. However, a double sided exponential with a sharp peak in the center is not easily realized as a focal beam pattern in most physical systems. Furthermore when imaged on a log scale, the exponential function has a linear fall off that may not be compact enough for some applications. Also, stabilized pulses are not generally found for typical symmetric functions and beam patterns, as previously described in (Parker, 2012, Superresolution imaging of scatterers in ultrasound B-scan imaging, J Acoust Soc Am 131:4680-9). However, described herein are examples of functions that are symmetric, are more compact than the simple exponential, and have stable inverse filters.

In theory, consider a discrete function f[k], k=0, 1, ..., n−1, symmetric about the point (n−1)/2 where n is odd. This has a Z-transform $$F(z) = \sum_{k=0}^{n-1} f[k]z^{-k}.$$

The roots of F(z)=0 are the poles of the inverse filter of the discrete samples $\{a_k=f[k], k\in[0, n-1]\}$. In order to have a stable inverse filter, the roots cannot be located on the unit circle to avoid singularity. Note that n is set to be odd for simplicity, and n≥3. Because of the symmetry of such a function, let $a_k=a_{n-1-k}$, thus the above equation is the same with $$a_{(n-1)/2}z^{-(n-1)/2} + \sum_{k=0}^{(n-3)/2} a_k(z^{-k} + z^{-k-n+1}) = 0,$$

where items with the same coefficients have been combined. Dividing both sides by $z^{-(n-1)/2}$, the equation is transformed to $$a_{(n-1)/2} + \sum_{k=0}^{(n-3)/2} a_k \left( z^{k-\frac{n-1}{2}} + z^{\frac{n-1}{2}-k} \right) = 0$$

which can be re-written in the form of $$g(y) = \sum_{k=0}^{(n-1)/2} b_k y^{k-\frac{n-1}{2}} = 0$$

where $$y = z + \frac{1}{z},$$

and $\{b_k\}$ the new coefficients, are related to original $\{a_k\}$ by the binomial theorem.

Focusing now on the zeroes of F(z) with the help of g(y), suppose that there is some root $z=z_0$ with $|z_0|=1$, then obviously $z_0$ can be represented as $e^{j\theta}$. If that is true, g(y) will correspondingly have a zero $$y_0 = z_0 + \frac{1}{z_0} = e^{j\theta} + e^{-j\theta} = 2\cos\theta \in [-2, 2].$$

Note that the above process from $|z_0|=1$ to $y_0 \in [-2,2]$ is necessary and sufficient. Therefore, in order to have all the zeroes of F(z) to be away from the unit circle, it is required that the zeroes of g(y) be outside the range of [−2, 2]. Here the range [−2, 2] only applies to the real number, which means that any of the complex zeroes of g(y) with non-zero imaginary part meets the requirement.

With the introduction of g(y), there is a "one-direction" criterion (y outside of [−2,2]) instead of "two-direction" ($|z|>1$ and $|z|<1$), which enables the use of many classical root-testing methods, such as the classical Jury stability criterion (Shinners, 1998, Advanced modern control system theory and design, New York, N.Y., Wiley). The following are three theoretical considerations to further assess the zeroes of g(y): 1) The Enestrom-Kakeya theorem (Prasolov and Leites, 2004, Polynomials. Berlin etc., Springer) which states a relationship between the range of the roots and the ratios between the coefficients. However, this criterion is quite loose. 2) The Jury stability criterion, which is used here to test whether all the zeroes are outside the circle of $|y|>2$ in the Z-plane, where a substitution of $$y' = \frac{2}{y}$$

should be made before the test. However, this is still not tight enough, because the Jury stability criterion requires all of $|y|$ to be greater than 2, while in fact this is unnecessary for the roots of g(y)=0 with non-zero imaginary parts. 3) Solving the equation of g(y)=0 directly, so that it could be determined whether a root is pure real or complex. Then the criterion of $|y|>2$ can be applied to only the pure real roots. Note that if some general results are desired, the roots should be in analytical form. Therefore, there is limitation for the number of coefficients (no more than 9 for F(z)) given the fact that there is no general algebraic solution—that is, solution in radicals—to polynomial equations of degree five or higher (Jacobson, 2012, Basic Algebra I Second Edition, Dover Publications). Among these possibilities lies some sub-set of functions that have stable inverses. Accordingly, methods for identifying stable symmetric pulse functions useful for super-resolution ultrasound imaging include the methods for assessing the zeroes of g(y) described above.

EXPERIMENTAL EXAMPLES

These examples are provided for purposes of illustration only, and are not intended to be limiting unless otherwise specified. Thus, the claims should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, practice the claimed methods. The following working examples are not to be construed as limiting in any way the remainder of the disclosure.

Example 1

7-Point Coefficients

Figure 2:
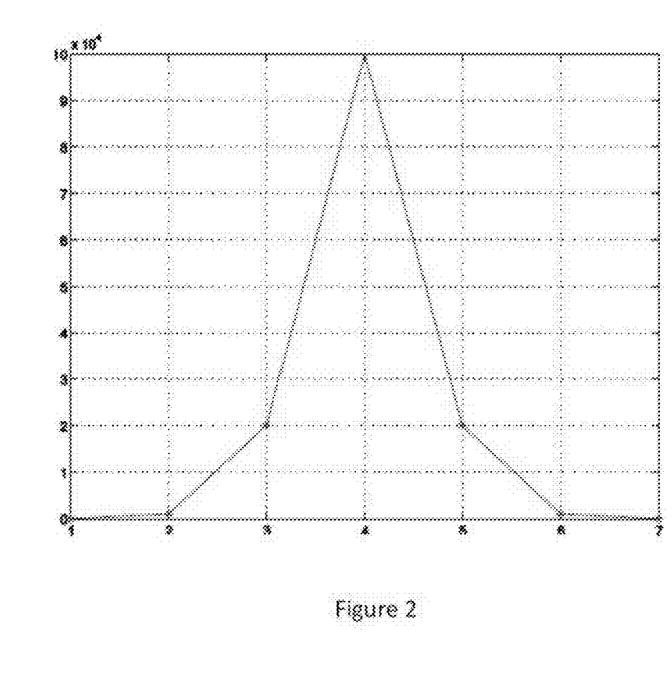
FIG. 2 is a graph of a "man-made" 7-point symmetric function.
Figure 3:
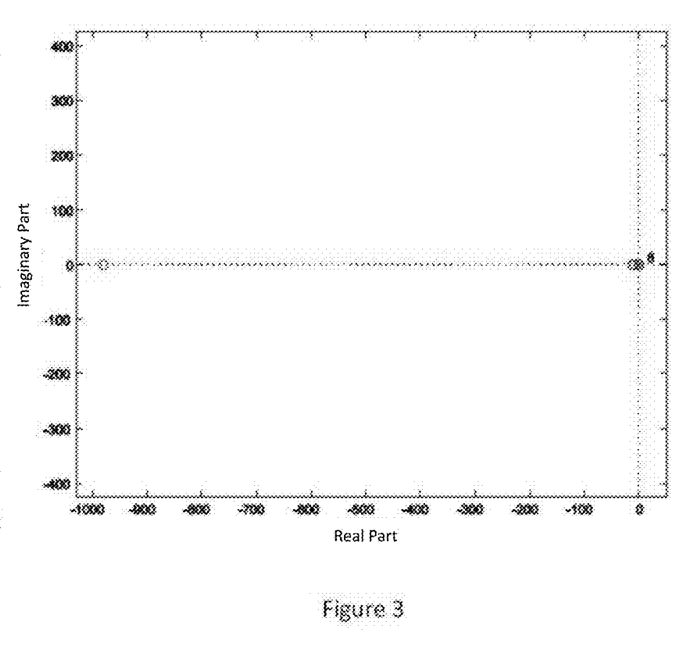
FIG. 3 is the Z-plane diagram of the man-made 7-point symmetric function of FIG. 2, global view.
Figure 4:
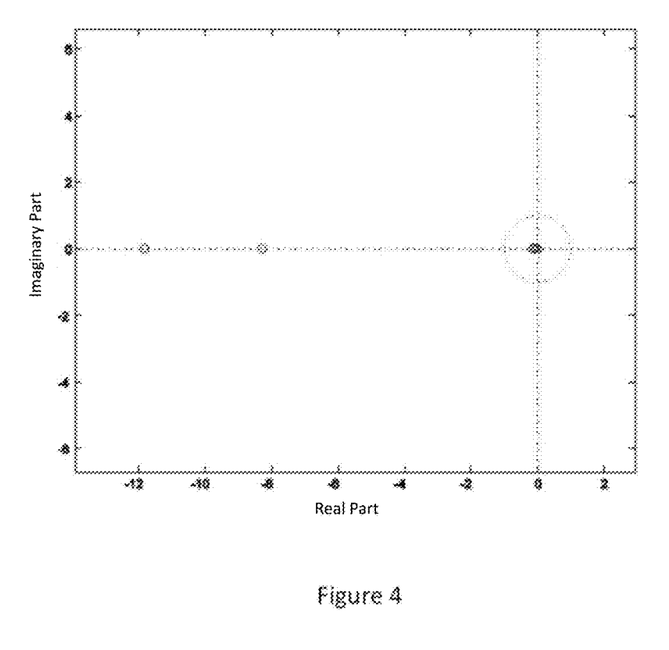
FIG. 4 is the Z-plane diagram of the man-made 7-point symmetric function of FIG. 2, middle-scale view.
Figure 5:
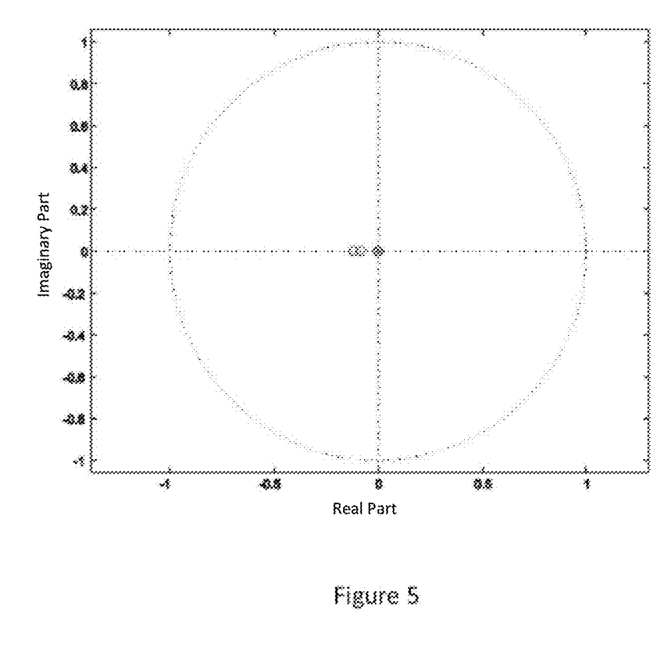
FIG. 5 is the Z-plane diagram of the man-made 7-point symmetric function of FIG. 2, inside the unit circle.
Figure 6:
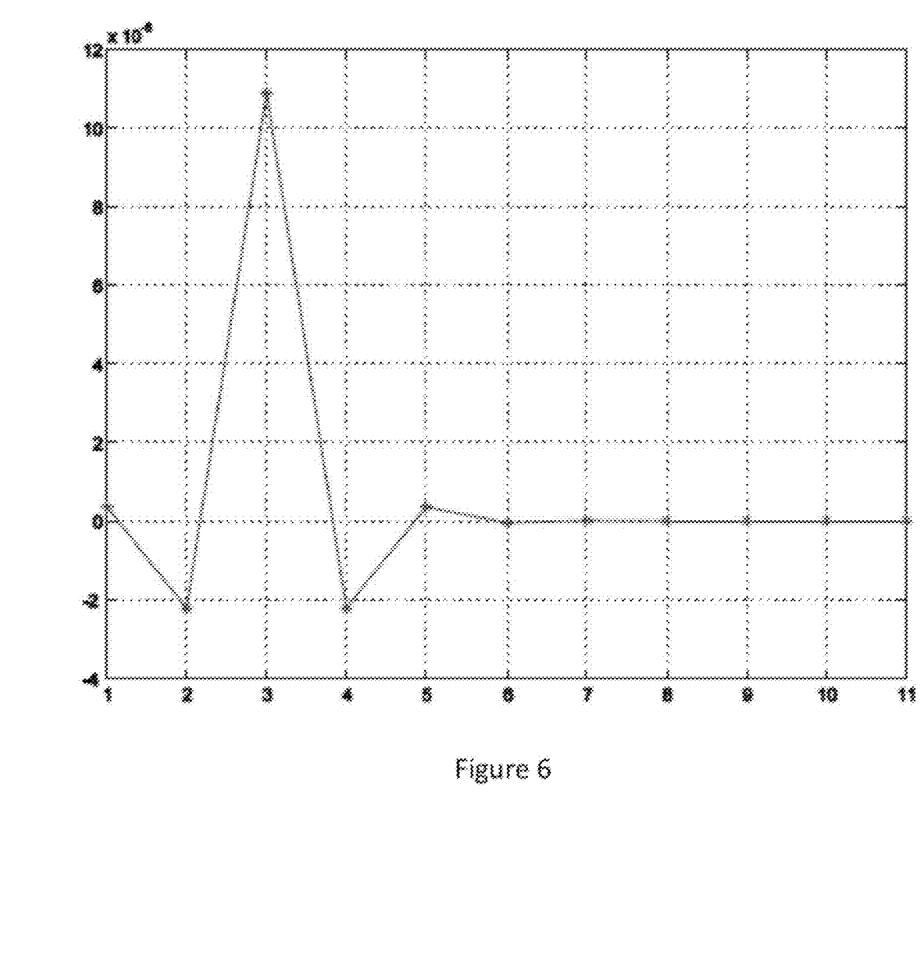
FIG. 6 is a diagram of the stable inverse filter of the man-made 7-point point symmetric function of FIG. 2.

Specifically, the 7 coefficients are {1, 1000, 20000, 100000, 20000, 1000, 1}. FIG. 2 shows the signal itself. FIG. 3, FIG. 4, and FIG. 5 show the Z-plane diagram for different scaling, from which it can be found that none of zeroes of the function made by the coefficients is located at the unit circle, which leads to a stable inverse filter shown in FIG. 6.

Example 2

A 7-Point Beam Pattern

Figure 7:
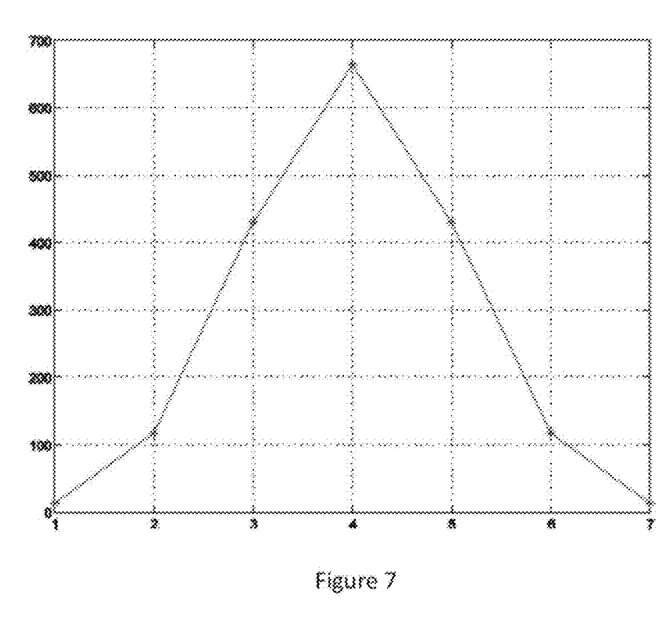
FIG. 7 is a diagram of the lateral focal cut of an ultrasound RF-image of a single scatter at the focal depth.
Figure 8:
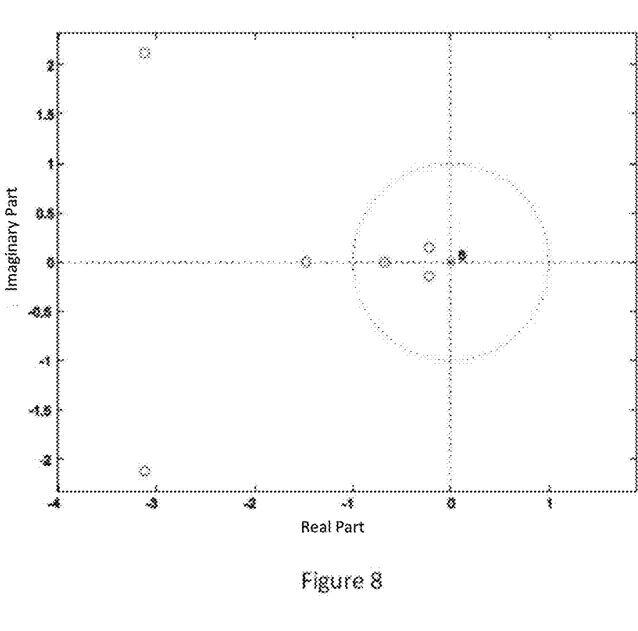
FIG. 8 is the Z-plane diagram of the focal cut of FIG. 7.
Figure 9:
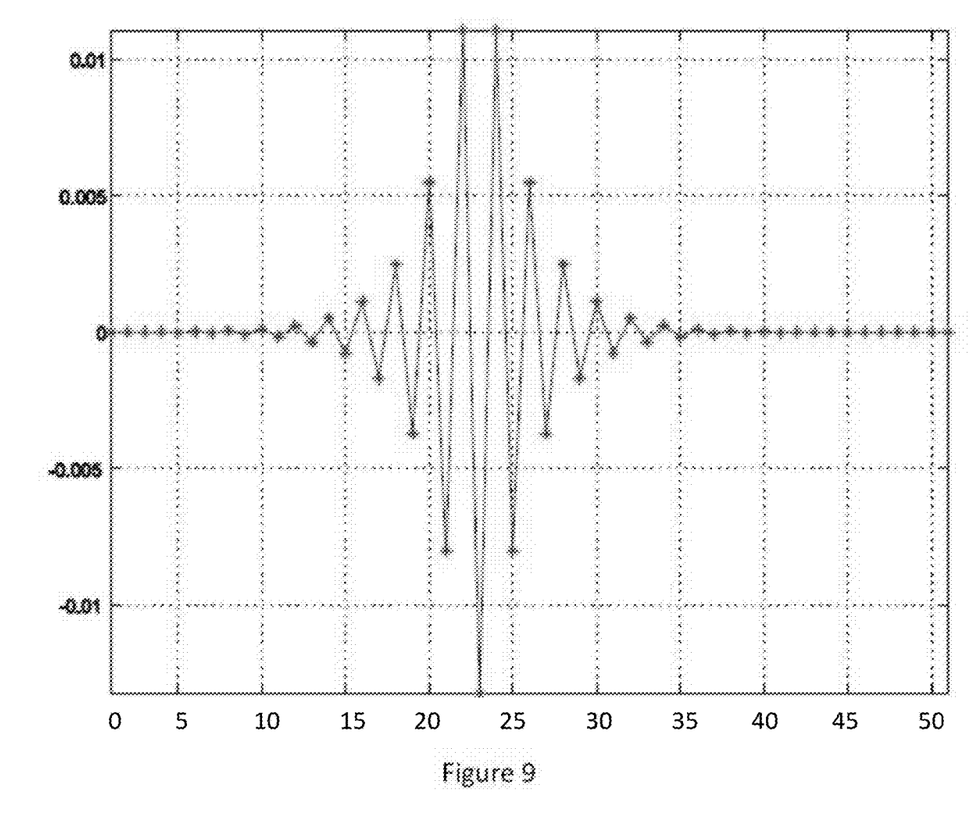
FIG. 9 is a diagram of the stable inverse of the focal cut of FIG. 7.

A symmetric function with a stable inverse filter can also be found from a lateral focal cut of the ultrasound RF-image of a single scatter at the focus. This was achieved using Field II Ultrasound Simulation Program (Jensen and Svendsen, 1992, Calculation of pressure fields from arbitrarily shaped, apodized, and excited ultrasound transducers, Ultrasonics, Ferroelectrics and Frequency Control, IEEE Transactions 39:262-7; Jensen, Field: a program for simulating ultrasound systems, 10th Nordibaltic Conference on Biomedical Imaging, 1996, 351-3553). A 5 MHz center frequency, 70% bandwidth linear array transducer was simulated, with 128 elements and a Gaussian apodization focused to 33 mm depth. FIG. 7, FIG. 8, and FIG. 9 show the lateral focal cut, its Z-plane diagram, and its stable inverse filter, respectively. The Z-plane again has all of its zeroes away from the unit circle.

Example 3

Focal Pattern From a 50% Bandwidth Pattern

Also simulated in Field II, a set of focal beam patterns of a 5 MHz, 50% bandwidth focused beam are found, having stable inverse filters from different depths of the focal pattern of the RF-image of a single scatter located at the focus. The RF-signals are down-sampled axially such that new sampling frequency is twice of the center frequency.

Figure 10:
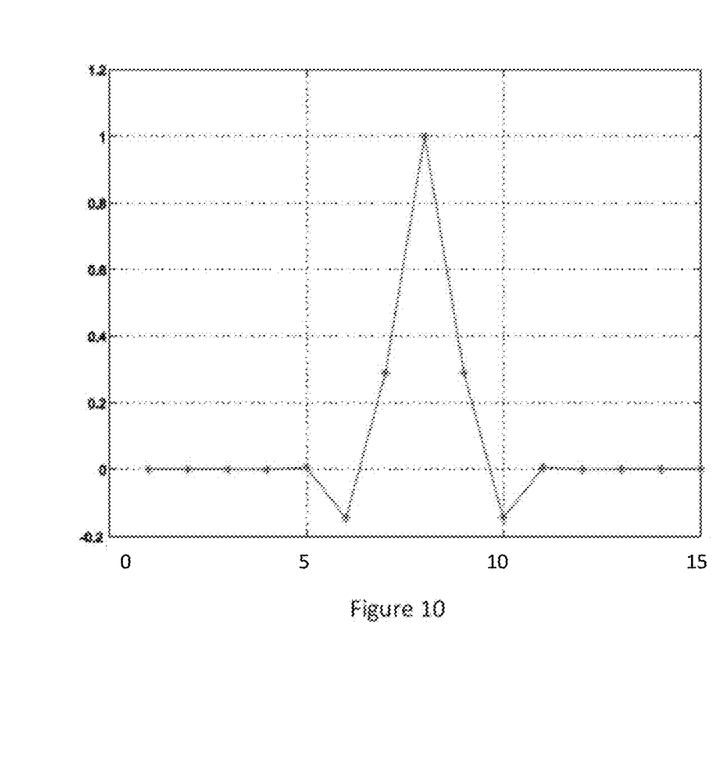
FIG. 10 is a diagram of the first lateral focal cut of a set of cuts from different depth of an ultrasound RF-image of a single scatter at the focal depth.
Figure 11:
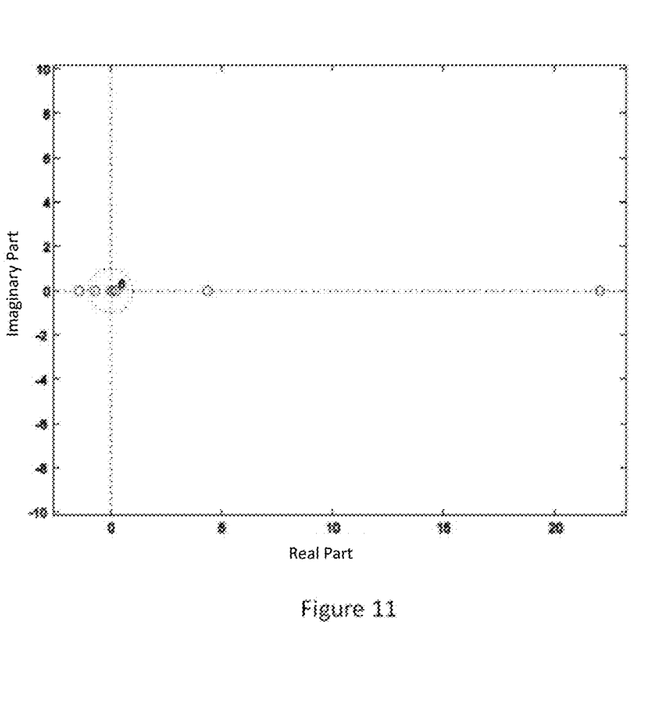
FIG. 11 is the Z-plane diagram of the focal cut of FIG. 10.
Figure 12:
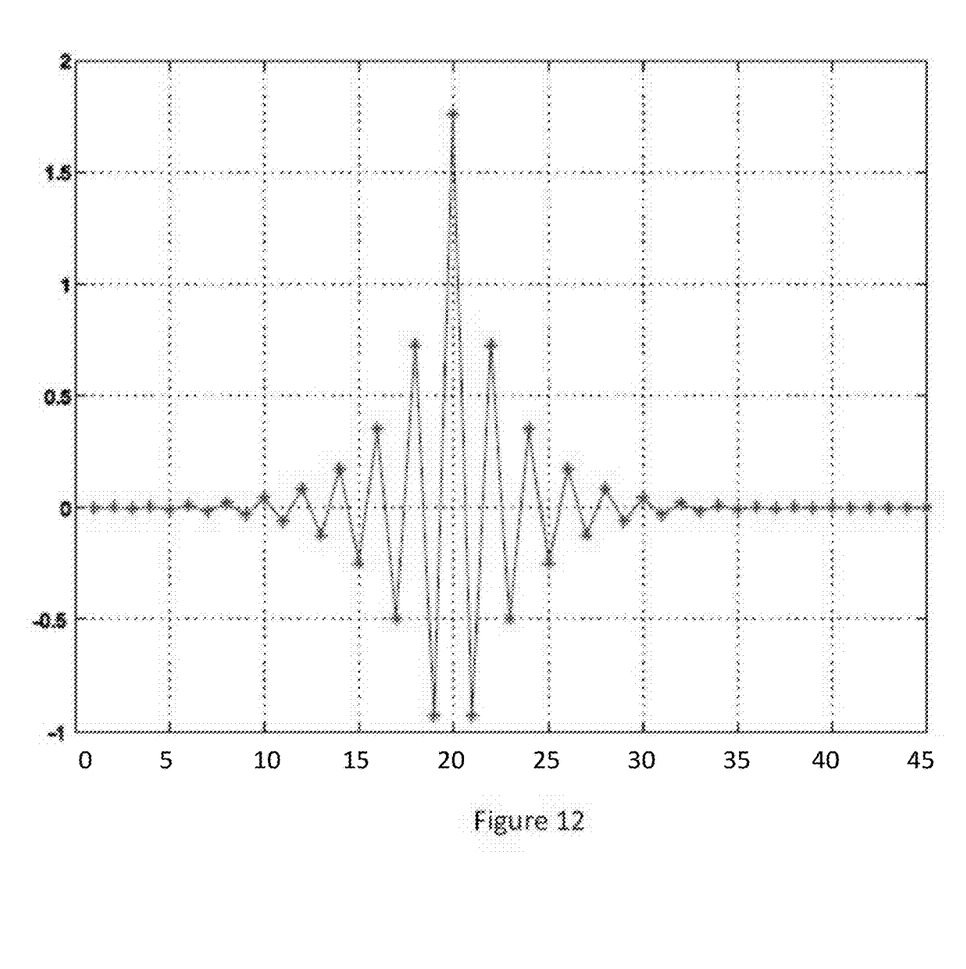
FIG. 12 is a diagram of the stable inverse of the focal cut of FIG. 10.

Here, only the first cut is shown. The cut, together with its Z-plane diagram and its inverse filter can be found respectively in FIG. 10, FIG. 11, and FIG. 12.

Example 4

Cyst Image

As a practical matter it is noted that the following steps can be helpful in producing the superresolution image:

Additional inverse filters can be created from slightly shifted versions of the beam pattern corresponding to a scatterer located between the sampled points. These can be used and selected depending on some criteria, for example selecting the result providing the sharpest final image, or the minimum sidelobes.

Furthermore, as the beam width of a transducer generally depends on depth, additional inverse filters can be created from the specific measurements of the beam pattern at specific depths, for example the entire image can be divided into sub-zones for this purpose. Still further, the same principles can be applied to the signal in the axial direction, and an inverse filter operation can be performed in the axial as well as the transverse direction.

Finally, some post-processing using conventional filters can be helpful in reducing noise.

Figure 13:
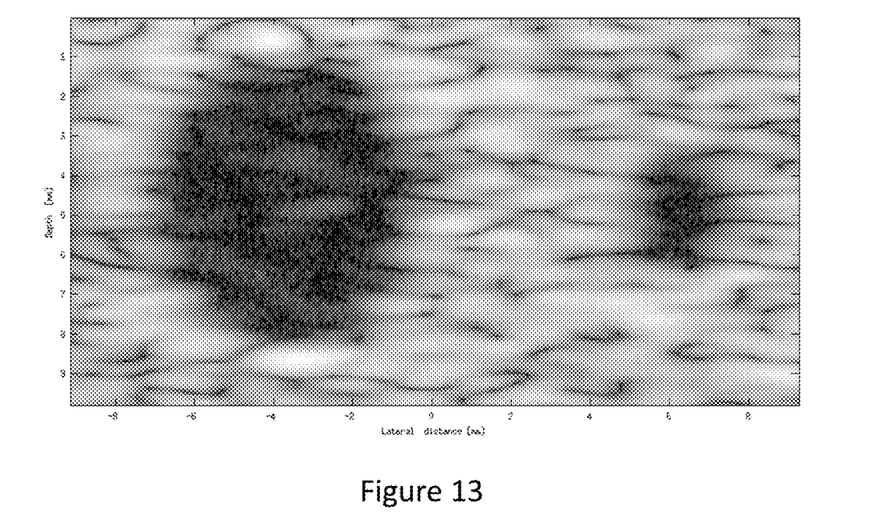
FIG. 13 is an image of a conventional B-scan.
Figure 14:
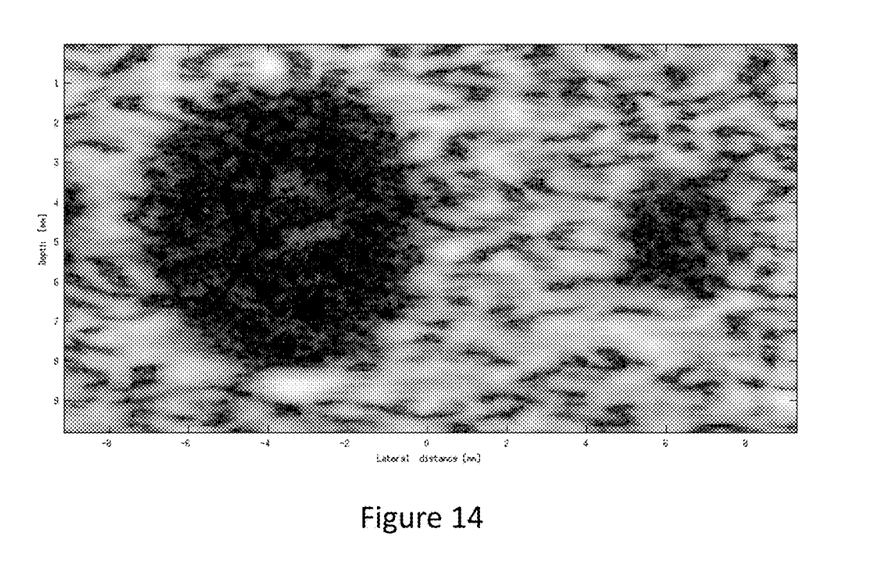
FIG. 14 is an image showing improved resolution following stabilized inverse filtering.

An ATS tissue mimicking phantom with two cysts was imaged with a Verasonics scanner and a 5 MHz linear array transducer. FIG. 13 shows the original B-scan with the typical speckle pattern and the smaller cyst nearly filled in with the sidelobes of the beam pattern. FIG. 14 demonstrates the improvement after processing with the stable inverse filter to improve resolution and contrast.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for imaging a region of interest using a pulse-echo imaging device, comprising:
   generating a stabilized symmetric pulse with a pulse-echo imaging device;
   directing the symmetric pulse to be incident on a region of interest, thereby producing a reflected echo;
   receiving the reflected echo with the pulse-echo imaging device;
   applying an inverse filter to the reflected echo to form inverse-filtered echo data, wherein the inverse filter is a stable inverse filter corresponding to the symmetric pulse; and
   creating an image of the region of interest from the inverse-filtered echo data.

2. The method of claim 1, wherein the pulse-echo imaging device comprises an ultrasound device.

3. The method of claim 1, wherein the inverse filter is an inverse Z transform.

4. The method of claim 3, wherein all of the zeroes of the Z transform lie within a unit circle.

5. The method of claim 1, wherein the inverse filter suppresses noise in the image.

6. The method of claim 1, wherein the image created is a super-resolution image.

7. A system for imaging of a region of interest, comprising:
   a pulse-echo imaging device for generating a stabilized symmetric pulse, and
   a processor in communication with the pulse-echo imaging device,
   wherein when a symmetric pulse generated by the device is incident on a region of interest, a reflected echo is received by the device; an inverse filter corresponding to the symmetric pulse is applied to the reflected echo via the processor to produce inverse-filtered echo data; and the inverse-filtered echo data corresponds to an image of the region of interest.

8. The system of claim 7, wherein the pulse-echo imaging device comprises an ultrasound imaging device.

9. The system of claim 7, wherein inverse filter is an inverse Z transform.

10. The system of claim 9, wherein all of the zeroes of the Z transform lie within a unit circle.

11. The system of claim 7, wherein the inverse filter suppresses noise in the image.

12. The system of claim 7, wherein the image is a super-resolution image.

13. An system for imaging a region of interest, comprising:
    a computer-readable storage medium; and
    code stored on said storage medium, wherein when executed on a processor in communication with a pulse-echo imaging device, the code:
    generates a stabilized symmetric pulse with the pulse-echo imaging device, wherein when the symmetric pulse is incident on a region of interest, a reflected echo is received by the pulse-echo imaging device;
    applies an inverse filter to the reflected echo to produce inverse-filtered echo data, wherein the inverse filter is a stable inverse filter corresponding to the symmetric pulse; and
    creates an image of the region of interest from the inverse-filtered echo data.

14. The system of claim 13, where in the pulse-echo imaging device comprises an ultrasound imaging device.

15. The system of claim 13, wherein the inverse filter is an inverse Z transform.

16. The system of claim 15, wherein all of the zeroes of the Z transform lie within a unit circle.

17. The system of claim 13, wherein the inverse filter suppresses noise in the image.

18. The system of claim 13, wherein the image is a super-resolution image.

19. The system of claim 13, wherein the inverse filter is created from a shifted version of a beam pattern.

20. The system of claim 19, wherein the beam pattern corresponds to a scatterer located between first and second sampled points.

* * * * *